Figure 1:
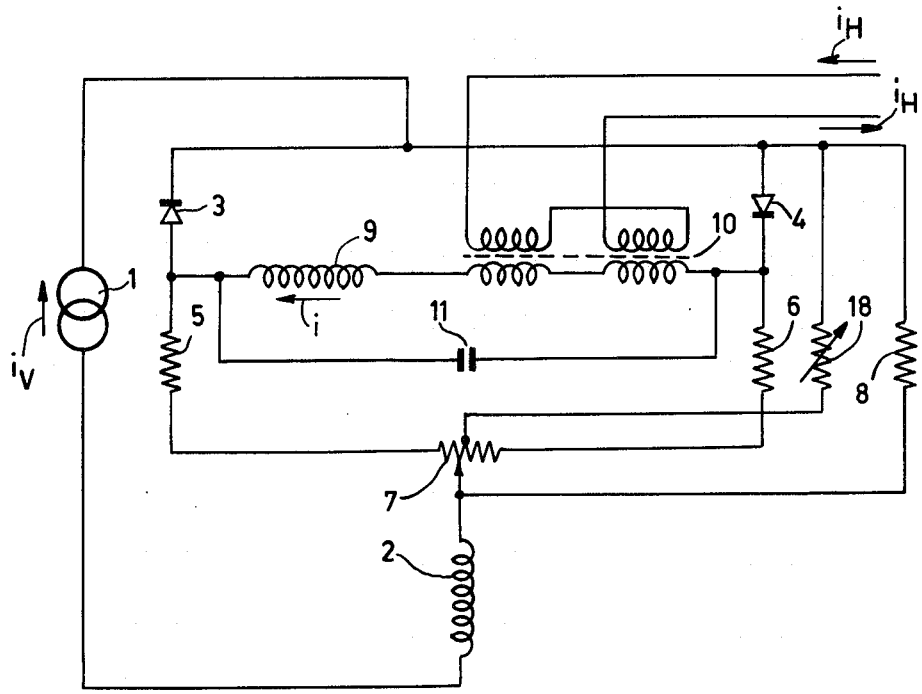

United States Patent [19]

Kantelberg et al.

[11] 4,028,585
[45] June 7, 1977

[54] CIRCUIT FOR GENERATING A CORRECTION CURRENT FOR CORRECTING FOR DEFLECTION ERRORS ON THE DISPLAY SCREEN OF A COLOR TELEVISION DISPLAY TUBE

[75] Inventors: Adrianus Hubertus Kantelberg; Leonardus Albertus Antonius Valkestijn, both of Eindhoven, Netherlands

[73] Assignee: U.S. Philips Corporation, New York, N.Y.

[22] Filed: Mar. 11, 1976

[21] Appl. No.: 665,954

[30] Foreign Application Priority Data

Mar. 27, 1975  Netherlands ............... 7503666

[52] U.S. Cl. .............................. 315/371; 315/407
[51] Int. Cl.² ..................................... H01J 29/56

[58] Field of Search ............ 315/13 C, 368, 407, 315/371, 370

[56] References Cited

UNITED STATES PATENTS 3,622,835  11/1971  Parker ................. 315/13 C
3,949,269  4/1976  Wheeler ................ 315/370

Primary Examiner—Maynard R. Wilbur
Assistant Examiner—T. M. Blum
Attorney, Agent, or Firm—Frank R. Trifari; Henry I. Steckler

[57] ABSTRACT

A circuit in a color television receiver for generating a correction current of field frequency for a quadripolar winding which is positioned on the core of the deflection coil. The circuit is in series with the deflection coil and constitutes a bridge circuit with diodes and resistors. A resistor is included in one diagonal branch and the winding in the other.

9 Claims, 6 Drawing Figures

CIRCUIT FOR GENERATING A CORRECTION CURRENT FOR CORRECTING FOR DEFLECTION ERRORS ON THE DISPLAY SCREEN OF A COLOR TELEVISION DISPLAY TUBE

The invention relates to a circuit for generating a correction current for correcting for deflection errors on the display screen of a colour television display tube in a colour television receiver comprising an output amplifier for supplying a deflection current of field frequency to a deflection coil for deflecting in the vertical direction at least one electron beam generated in the display tube, whilst an auxiliary winding through which the correction current flows is positioned on the core of the deflection coil for generating a magnetic quadripolar field substantially in the deflection plane.

British Pat. Nos. 1,323,154 and 1,323,155 which correspond to U.S. application Ser. No. 447,564, filed Mar. 4, 1974, explain in which way such a quadripolar field can correct for deflection errors which are produced by the isotropic astigmatism and/or by asymmetries in the position of the electron guns with respect to the deflection field. To this end a correction current is generated which may comprise both a component of line frequency which corresponds with the horizontal deflection and a component of field frequency corresponding with the vertical deflection, which current flows through the auxiliary winding. Each of these components may comprise a sawtooth and/or a parabolic component. The auxiliary winding consists of at least four partial windings which are wound toroidally on the core of the deflection unit.

For generating the component of the field frequency of the correction current some circuits have been proposed. One of these circuits is described in said British Patents and comprises a large number of active elements, which is due to the fact that the circuit is entirely separated from the field output amplifier. Other and cheaper circuits on the other hand are based on the fact that this amplifier supplies a sawtooth current of field frequency (see for example the publication "Transactions BTR" of November 1974, page 297, FIG. 12). The correction current of field frequency may, for example, be derived by means of resistors which are included between two output transistors and across which there is a sawtooth voltage or by means of a shaping network which is connected to that output terminal of the amplifier to which also the deflection coil is connected. A disadvantage of such a measure is that the output amplifier no longer works optimally, so that linearity errors of the deflection current may be produced, whilst it has appeared that other detrimental effects may occur such as thermal overload or convergence drift, the latter when the deflection coils get warm.

It is an object of the invention to provide a circuit which does not have these disadvantages and to that end the circuit according to the invention is characterized in that the circuit is arranged in series with the deflection coil and constitutes a bridge circuit comprising diodes and resistors, whilst a resistor is included in a diagonal branch of the bridge circuit, the auxiliary winding being included in the other diagonal branch.

As the amplitude of the deflection current is kept substantially constant because the amplification of the output amplifier is controlled and/or by the fact that feedback is applied, also the current through the circuit will remain constant whilst the circuit will substantially not affect the amplifier.

Figure 2:
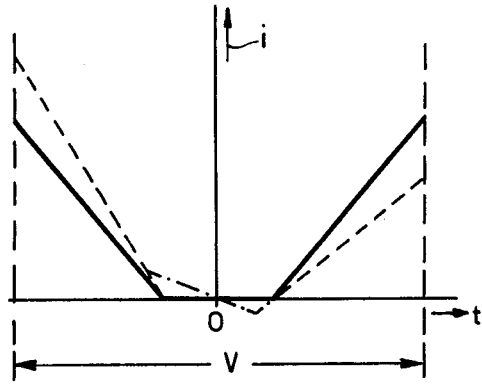

The invention will be described by way of example with reference to the accompanying Figures in which
FIG. 1 is an embodiment of the circuit according to the invention,
FIG. 2 shows the variation of the correction current in the circuit of FIG. 1 against time and
FIG. 3 to 6 inclusive show further embodiments of the circuit according to the invention.

In the embodiment of FIG. 1 reference 1 represents a field output amplifier of a colour television receiver not further shown, which amplifier produces in known manner a sawtooth deflection current $i_v$ of field frequency and of a constant amplitude and supplies it to a deflection coil 2. A bridge circuit is formed by two oppositely conducting diodes 3 and 4, two limiting resistors 5 and 6 of equal value and a potentiometer 7, these elements being interconnected as shown in FIG. 1. A resistor 8 is included in a diagonal branch of the bridge circuit, i.e. between the junction point of diodes 3 and 4 and the wiper of potentiometer 7, deflection coil 2 being connected to this wiper. Arranged in the other diagonal branch of the bridge circuit, i.e. between the junction point of diode 3 and resistor 5 and that of diode 4 and resistor 6 is the series arrangement of an auxiliary winding 9 and a secondary winding of a transformer 10 through a primary winding of which a current $i_H$ of line frequency flows which is derived from a line deflection circuit (not shown). A capacitor 11 is in parallel with this series arrangement and is used for decoupling the signals of line frequency.

If current $i_v$ flows, then diodes 3 and 4 respectively do not pass current until the sawtooth voltage across resistor 8 exceeds in the pass direction the threshold voltage of the diode. Then the diode is considered to be an ideal switch. During the scanning period of current $i_v$ a substantially linearly decreasing current first flows through winding 9 and diode 3, then no current and thereafter a substantially linearly increasing current flows through diode 4 and winding 9. The impedance of winding 9 is mainly ohmic at field frequency.

In FIG. 2 the current i through winding 9 is plotted against time, the field scanning time being indicated by V. It appears from FIG. 1 that current $i$ invariably flows in the same direction. The duration of the currentless period in the middle of time V depends on the amplitude of the voltage across the resistor 8 and consequently on the value of this resistor (approximately 2.2Ω). In FIG. 2 the solid curve indicates the variation of current $i$ when the wiper of potentiometer 7 is in its center position. If it deviates from this position then the value of the resistance in series with resistor 5 (approximately 1Ω) is not equal to the value of the resistance in series with resistor 6, so that the dashed curve of FIG. 2 is obtained: the slobe of one edge increases whilst the slope of the other edge decreases. This curve approximately has the form of a tilted parabola, consequently current $i$ can be conceived as being split into a parabolic and a sawtooth component. With this the amplitude of the first component is fixed, it depends on the value of resistors 5 and 6, on that of potentiometer 7 (approximately 3.3Ω), on the type of diodes and on the amplitude of current $i_v$. The adjustment of the wiper of potentiometer 7 gives an adjustment of the sawtooth component. The circuit described does not affect current $i_v$ which is constant.

The peak of the "parabola" in FIG. 2 i.e. the length of line drawn along the time axis is not affected by the adjustment of potentiometer 7. An adjustment of the peak may however be desirable. This is achieved by providing potentiometer 7 with a center tap to which a variable resistor 18 (of maximum value approximately 6.8Ω) is connected. The other end of resistor 18 is connected to the junction point of diodes 3 and 4. A sawtooth current flows through this resistor. When potentiometer 7 is in its center position then the shape of current i is not changed. However, the value of resistor 18 also determines the amplitude of the generated parabola as this resistor is in parallel with resistor 8. If this value is zero then the parabolic component is also zero and only an adjustment of the sawtooth component remains. Consequently the amplitude of the parabola can be adjusted by means of resistor 18. By adjusting potentiometer 7 it is achieved that a part of the current through resistor 18 also flows through winding 9. Consequently the peak of the parabola varies as indicated in FIG. 2 by the dashed-dotted line, whilst the sawtooth is adjusted in the manner discussed already. A "rotation" of the peak of the parabola is obtained in this manner. It will be noted that the curve obtained better approximates the parabolic form than when resistor 18 is not applied and cuts the time axis as desired in the middle O of scanning time V. The rotation is coupled to the adjustment of the sawtooth component, which is correct as the parabola is better approximated in the absence of this component without rotation.

Winding 9 is constructed as the series arrangement of four partial windings which are wound toroidally on the core of magnetic material on which also deflection coil 2 is applied and generates a correction quadripolar field with which deflection errors can be eliminated in known manner.

Figure 3:
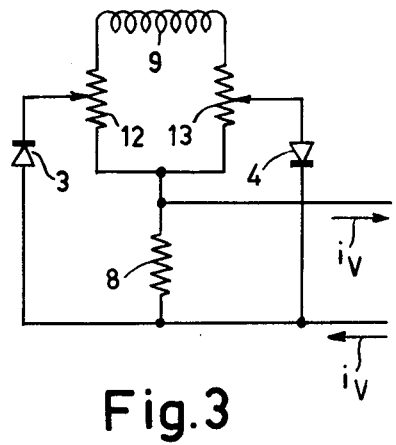

In the construction of FIG. 3 in which amplifier 1, deflection coil 2, transformer 10 and capacitor 11 have not been drawn for simplicity, two potentiometers 12 and 13 are used. Through diodes 3 and 4, connected to their wipers half a sawtooth current is supplied to each potentiometer. In this manner both halves of the substantially parabolic current flowing through winding 9 are adjustable between zero and a maximum value, which value depends on the amplitude of current $i_v$. So the correction in the displayed picture respectively above and below the central horizontal line of the display screen is separately adjusted by means of the potentiometers. One adjustment does not affect the other one because the resistance in series with the quadripole winding in the one branch remains constant for the current half flowing to the other branch. Also here the duration of the currentless period is determined by the value of the fixed resistor 8 which is included in a diagonal branch. An adjustment such as in FIG. 1 with which a rotation of the peak of the parabola can be obtained is, however, not possible.

Figure 4:
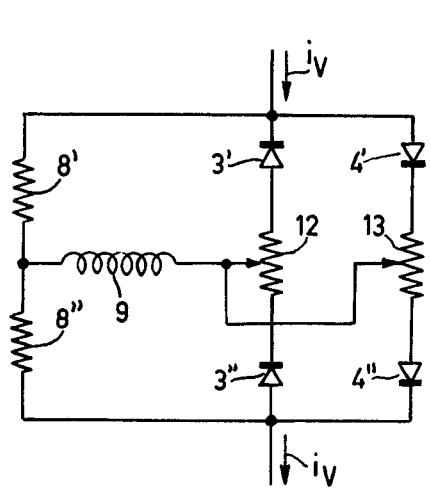

The circuit according to FIG. 4 has the same properties as that according to FIG. 3. Now diodes 3 and 4 respectively are replaced by two diodes 3' and 3" and 4' and 4" respectively which are interconnected through potentiometer 12 and 13 respectively, whilst winding 9 is included between the junction point of two resistors 8' and 8" (of, for example, approximately 0.56 Ψ) and that of the wipers of the potentiometers. The series arrangement of resistors 8' and 8< replaces the resistor in the diagonal branch across which the sawtooth voltage is found. This construction offers the advantage that the current through the diodes may be low by choosing high-ohmic potentiometers so that the current consumption of the circuit is low.

The correction can be performed symmetrically by the circuits described. In some types of display tubes, however, the correction must be asymmetrical, i.e. the range of, for example, potentiometers 12 and 13 in FIG. 4 need not go through the value zero. The range can be limited by applying a resistor (of, for example, approximately 47Ω) between potentiometer 12 and 13 respectively and diode 3" and 4' respectively.

Figure 5:
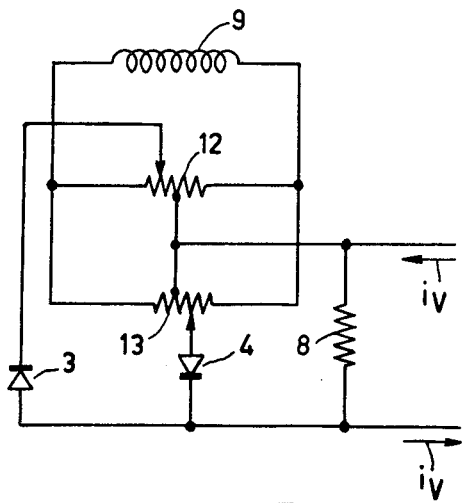

The lay-out of FIG. 5 is a variant of that of FIG. 3. Here the potentiometers 12 and 13 (of, for example, approximately 6.8Ω) each have a centre tap. Both centre taps are interconnected, while winding 9 is in parallel with the parallel circuit of the potentiometers. By means of the construction of FIG. 6 both a parabolic and a sawtooth component can be adjusted symmetrically, i.e. going through zero, whilst both adjustments are independent of one another. If the wiper of the potentiometer 14 which is connected as indicated in the figure is in the connection thereof which is drawn at top, then the current through diodes 3+ and 4' exceeds that through 3" and 4". A substantially parabolic current whose direction can be reversed by means of potentiometer 14 and which is zero if the wiper is in the centre position flows through winding 9. Independent thereof the sawtooth component is adjusted by means of potentiometer 7. The parallel resistor which determines the moment at which the diodes start conducting is doubled in FIG. 6: resistor 8 determines also, and in particular, the amplitude of the parabolic component whilst resistor 15 which is arranged between the centre taps of potentiometers 7 and 14 affects this amplitude to a lesser degree. This enables some measure of adjustment of the wave form, because the rotation of the peak of the parabola can be adjusted.

Also in the constructions of FIG. 3, 4, 5 and 6 a secondary winding of the transformer 10 for the correction at line frequency is in series with winding 9, whilst a capacitor 11 is in parallel with the series circuit formed. If this capacitor is constructed as an electrolytic capacitor then, in the case where the correction current of field frequency goes through zero, it must be replaced by two electrolitic capacitors which are connected in series and with opposite polarities. With one capacitor of this nature a reversal of the DC voltage is not permitted. In the construction according to FIG. 5 and 6, however, these capacitors can be dispensed with as the potentiometers which are in parallel with winding 9 have a sufficiently low resistance (for example approximately 3.3Ω) with respect to the impedance at the line frequency of the winding.

Figure 6:
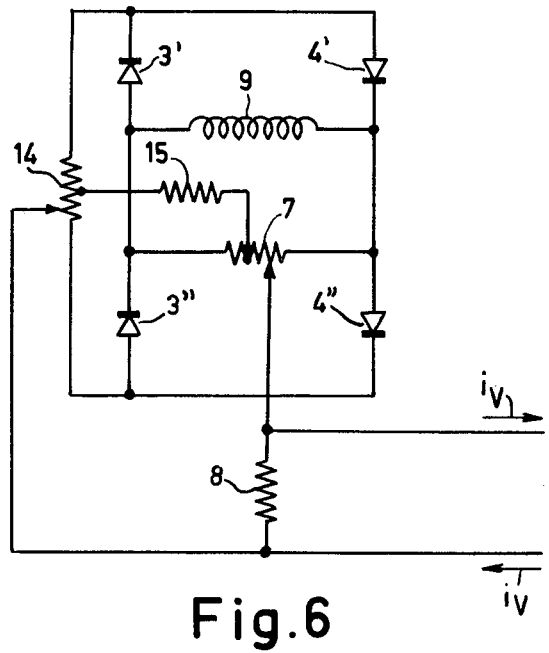

A variant of the construction of FIG. 6 is possible in which the terminal of resistor 15 drawn at the left is connected to the wiper of potentiometer 14 and the terminal of resistor 8 drawn at the bottom is connected to the centre tap of this potentiometer. Then the impedance of the circuit is more constant than in the case of FIG. 6 whilst the energy consumption can be lower for the same amplitude.

In all embodiments the various diodes can be replaced advantageously by transistors connected as diodes, i.e. transistors whose collector and base are interconnected. Larger currents can flow through them whilst the voltage drop across them is low.

What is claimed is:

1. A circuit for use with vertical deflection coil having a core and an auxiliary winding means disposed on said core for generating a magnetic quadripolar field substantially in the deflection plane, said circuit comprising an output amplifier means for supplying a deflection current of field frequency to said deflection coil for deflecting in the vertical direction at least one electron beam generated in a display tube, and means for correcting deflection errors of said beam without affecting said field frequency deflection current comprising the circuit being adapted to be coupled in series with the deflection coil and including a bridge circuit comprising diodes and resistors, a resistor coupled in a diagonal branch of the bridge circuit, the auxiliary winding being adapted to be coupled in the other diagonal branch.

2. A circuit as claimed in claim 1, wherein the bridge circuit comprises two series arrangements including a diode and a resistor each, said arrangements being coupled in parallel with one another, the direction of conductivity of the diodes being opposite, the auxiliary winding being adapted to be coupled between the junction point of a diode and a resistor and the junction point of the other diode and the other resistor.

3. A circuit as claimed in claim 2, wherein said bridge circuit comprises a potentiometer having a wiper, the ends of said series arrangement resistors not connected to the diodes being coupled to the respective ends of said potentiometer, the wiper being coupled to the resistor in the diagonal branch.

4. A circuit as claimed in claim 3, further comprising a resistor coupled between the junction point of the diodes and a centre tap of the potentiometer.

5. A circuit as claimed in claim 1, wherein said bridge circuit comprises two potentiometers, each having first ends coupled together, second ends adapted to be coupled to the auxiliary winding, and wipers, and two diodes of opposite conductivity directions coupled to said wipers respectively and to each other.

6. A circuit as claimed in claim 1, wherein said bridge circuit comprises two series arrangements, each including two diodes with the same conductivity directions and a potentiometer, said series arrangements being coupled in parallel with one another, and the series arrangement of two resistors, the auxiliary winding being adapted to be coupled between the junction point of the series arrangement resistors and the wipers of the potentiometer, said wipers being intercoupled.

7. A circuit as claimed in claim 1, wherein said bridge circuit comprises two parallel coupled potentiometers each having a center tap, said auxiliary winding being adapted to be coupled to said potentiometers, the center taps being coupled together, and two oppositely conducting diodes coupled to said wipers respectively and each other.

8. A circuit as claimed in claim 1, wherein said bridge circuit comprises two series circuits each including two diodes with the same conductivity directions, said series arrangements being parallel coupled with one another, a first potentiometer having a center tap coupled between the junction point of the diodes of a series arrangement and the junction point of the diodes of the other series arrangement, said auxiliary winding being adapted to be coupled between said junction points, a second potentiometer having a center tap parallel coupled with the parallel circuit of both series arrangements, the center tap of the first potentiometer being coupled to the center tap or the wiper of the second potentiometer, the resistor in the diagonal branch being coupled between the wipers of both potentiometers or between the wiper of the first potentiometer and the center tap of the second potentiometer.

9. A colour television receiver provided with a circuit as claimed in claim 1.

* * * * *

UNITED STATES PATENT AND TRADEMARK OFFICE
CERTIFICATE OF CORRECTION

PATENT NO. : 4,028,585
DATED : June 7, 1977
INVENTOR(S) : ADRIANUS HUBERTUS KANTELBERG ET AL It is certified that error appears in the above-identified patent and that said Letters Patent are hereby corrected as shown below:

IN THE TITLE PAGE

Section "[30]   Foreign Application Priority Data

Mar. 27, 1975   Netherlands.........7503666"

should read

--[30]   Foreign Application Priority Data

Mar. 27, 1975   Netherlands.........7503666
        Aug. 11, 1975   Netherlands.........7509527--

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*